United States Patent
Schmidt

(10) Patent No.: US 6,383,297 B1
(45) Date of Patent: May 7, 2002

(54) METHOD AND DEVICE FOR JOINT OXYDATION AND HEAT TREATMENT OF WORKPIECES

(75) Inventor: Hans-Peter Schmidt, Mettmann (DE)

(73) Assignee: Messer Griesheim GmbH (DE)

( * ) Notice: Subject to any disclaimer, the term of this patent is extended or adjusted under 35 U.S.C. 154(b) by 0 days.

(21) Appl. No.: 09/486,229
(22) PCT Filed: Aug. 5, 1998
(86) PCT No.: PCT/EP98/04871
§ 371 Date: Feb. 22, 2000
§ 102(e) Date: Feb. 22, 2000
(87) PCT Pub. No.: WO99/10556
PCT Pub. Date: Mar. 4, 1999

(30) Foreign Application Priority Data

Aug. 22, 1997 (DE) .......................... 197 36 514

(51) Int. Cl.$^7$ ............................................... B05C 11/00
(52) U.S. Cl. .................... 118/688; 118/690; 110/188; 148/284; 148/287; 148/660; 427/255.395
(58) Field of Search ................... 148/284, 287, 148/660; 427/255.395; 118/688, 690; 110/188

(56) References Cited

U.S. PATENT DOCUMENTS 2,269,943 A * 1/1942 Kiser .......................... 148/287
5,094,920 A * 3/1992 Shiozaki et al. ......... 428/472.1

* cited by examiner

Primary Examiner—John Sheehan
Assistant Examiner—Andrew L. Oltmans
(74) Attorney, Agent, or Firm—Connolly Bove Lodge & Hutz, LLP

(57) ABSTRACT

Disclosed is a method for joint oxydation and heat treatment of workpieces at temperatures $\leq 1300°$ in the treatment chamber of an oven containing a neutral or reactive gas in a temperature range above 570°. In order for the process to be reproducible and to produce homogeneous oxide layers, the $PH_2O/PH_2$ ratio is adjusted after transformation of the workpiece structure such as found at the ambient temperature into the structure wanted during the heat treatment in such a way that the line $FeO+H_2=Fe+H_2O$ is exceeded and an oxide layer is formed from $FEO<10$ $\mu m$.

4 Claims, 5 Drawing Sheets

Project: Hardening and blue-annealing in one step 3 mm hexagonal socket wrench / 58 CrV4 / starting material

100:1

500:1

1000:1

Project: Hardening and blue-annealing in one step 3 mm hexagonal socket wrench / 58 CrV4
9th experiment: 830°C, 39' neutral + 13' oxidized, oil-hardened

100:1

500:1

1000:1

METHOD AND DEVICE FOR JOINT OXYDATION AND HEAT TREATMENT OF WORKPIECES

The invention relates to a process and an apparatus for the joint oxidation and heat treatment of parts according to the preamble of the claims.

In the heat treatment of metal parts, generally, the gas atmosphere in the treatment compartment of a furnace is set in such a manner that a clean and bright metal surface is produced. Oxidation is undesirable in this case, since subsequent processes can be adversely affected by the oxide layers formed. However, there are special applications in which it is useful and expedient to produce an oxidic covering layer on the surface of the metal parts. The desired chemical composition and the thickness of these epitaxial oxidic covering layers make special requirements of the gas atmosphere in the treatment compartment of the furnace and the process procedure. By means of oxide layers produced in this defined manner, decorative surfaces can be produced which simultaneously act as corrosion protection, insulating layers or absorption layers.

The hardening and tempering or case hardening, carbonitriding etc. of solid parts is carried out in furnace systems, through the treatment compartment of which flow protective and/or reaction gases.

The parts are heated with the use of nitrogen in combination with reactive components or with endothermic atmosphere or the like to the particular austenitizing temperature, thermochemically treated and hardened by quenching in oil or water or liquid salt. In a subsequent second heat-treatment step, the required hardness is set by tempering the hardened parts. The tempering is generally performed at temperatures between 150° C. and 570° C. in an air or nitrogen atmosphere. Under these conditions, oxidation of the iron to magnetite ($Fe_3O_4$) can take place. The oxide layer does not have a sufficient layer thickness in this case to give an optically attractive decorative uniform surface.

Coating processes have therefore been used to produce a decorative uniform layer on the surfaces of the parts to be treated. Firmly adhering layers are applied to the surface by black-oxide coating, phosphatizing, enamelling and the like. These additional coating processes cause considerable process complexity and additional costs, with at times relatively non-uniform covering layers. Therefore, it has already been proposed to carry out hardening and blue-annealing in one process step (DE 43 33 940). This process was able to considerably decrease the coating costs, improve the process sequence, increase in the availability of the parts to be treated and decrease the use of chemicals, as also the emissions occurring in the process.

However, in the known process it would be desirable if the reproducibility could be increased with still more uniform oxide coat formation and the slight decarburization could be still further decreased.

The object underlying the invention is to provide a process for the joint oxidation and heat treatment of parts which is reproducible and leads to more uniform oxide layers of greater corrosion resistance.

This object is achieved according to the invention by the features specified in the claims.

Advantageous developments of the invention are specified in the subclaims.

Figure 1:
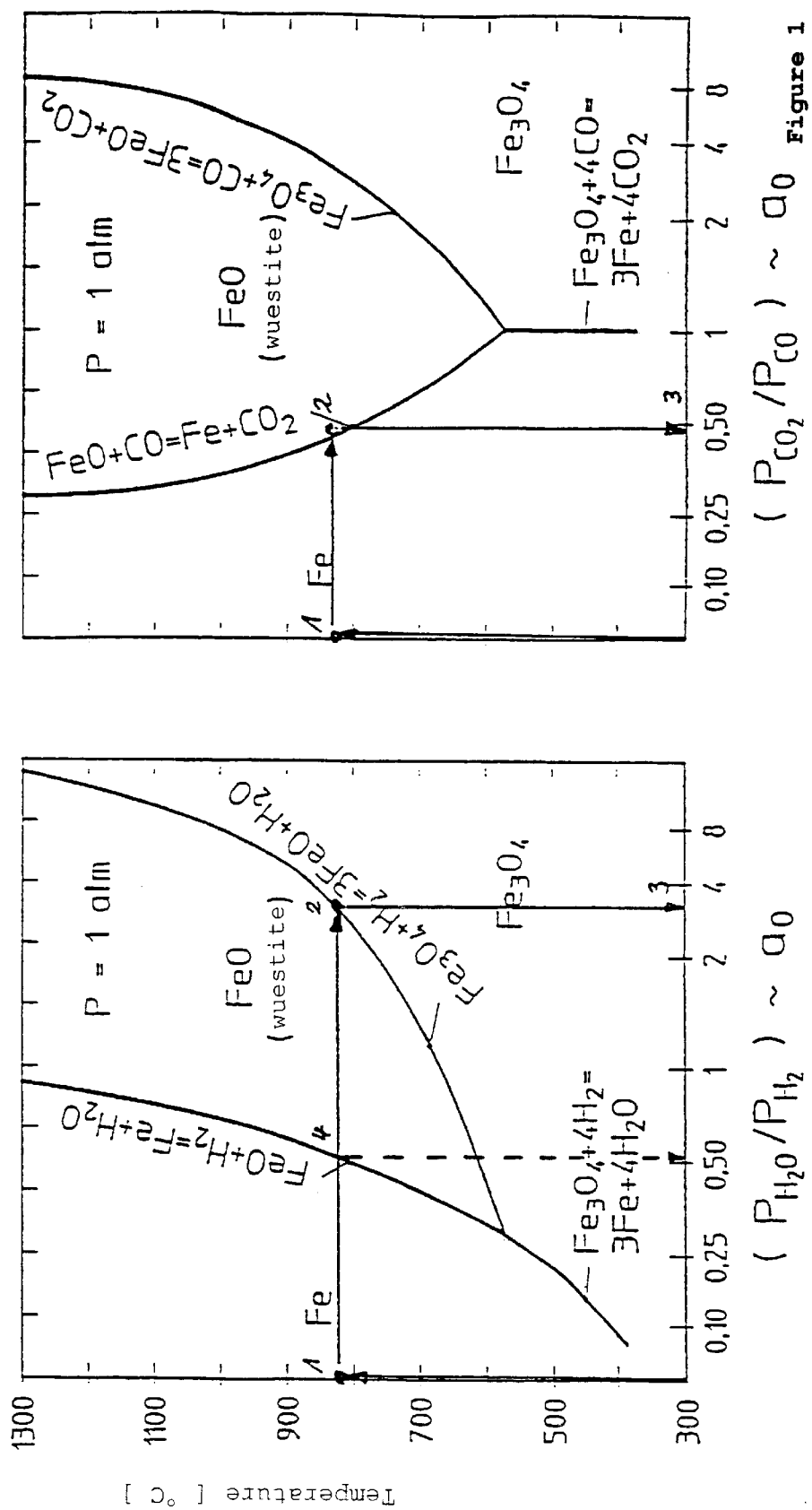
FIG. 1 illustrates two graphs plotting temperature and the $PH_2O/PH_2$ $PCO_2/PCO$ ratios.

In the process according to the invention, after conversion of the structure of the parts present at ambient temperature into the structure desired in the heat treatment, in the treatment compartment a $PH_2O/PH_2$ ratio is set in such a manner that the line $FeO+H_2=Fe+H_2O$ is exceeded and an oxide layer of FeO<10 μm is formed. Owing to the $PH_2O/PH_2$ ratio not being set in the treatment compartment until after conversion of the structure of the parts present at ambient temperature into the structure desired in the heat treatment, in the heat treatment of the parts, none of the reactants oxidizing the parts are present in the treatment compartment.

The heat treatment and the oxidation of the parts proceed in separate process steps in the joint treatment compartment or subsequent oxidation compartment, as a result of which the heat treatment of the parts and the oxidation of the parts can be controlled separately. By this means, a reproducible process procedure is possible, since the heat treatment and the oxidation do not influence one another.

At the predetermined limit temperature >570° and at the $PH_2O/PH_2$ ratio set in the treatment compartment the line $FeO+H_2=Fe+H_2O$ is exceeded.

Since the process procedure is conducted under isothermal conditions and iron is in equilibrium with the iron oxide formed, wuestite (FeO) is formed. Surprisingly, it has been found in this case that the FeO oxide layer formed at these high temperatures has a more uniform structure which is highly adherent, bubble-free, scratch-resistant and free of contact points.

Advantageously, an FeO oxide layer <10 μm is formed, since an oxide layer <10 μm does not detach during the cooling process following the process according to the invention, and does not form bubbles and cracks.

This oxide layer formed simultaneously has beneficial effects on the cooling rate during hardening, since the heat transfer coefficient is altered. It was found in this case that the heat transfer coefficient becomes smaller, so that a slower cooling of the parts takes place and thus less residual austenite is formed with case-hardened parts in the surface region.

Advantageously, the oxidation of the parts is completed in a period of <20 minutes, in particular ≦14 minutes, since in the course of this period the desired FeO layer of <10 μm is established at the conventional hardening temperatures of 800 to 900° C. Oxide layers between 2 and 6 μm have proved to be particularly advantageous. These layers are compact, opaque, well interlocked with the base material and have an attractive bluish-black to black surface.

On account of the extremely short oxidation time, decarburization in the edge region of the base parts was not observed.

The oxide layer formed thus prevents the decarburizing action of the water used, since it acts as a barrier layer and the growth rate of the forming oxide layer is higher than the decarburization rate by the reaction:

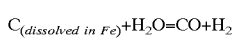

Since, in the treatment compartment, a $PH_2O/PH_2$ ratio of preferably <20, in particular <10, is established on passing in or atomizing the reactant at temperatures >570° C., wuestite (FeO) is formed exclusively. Surprisingly, it has been found in this case that even at higher $PH_2O/PH_2$ ratios, no $Fe_3O_4$ is formed. It is assumed that the FeO formation continues even at a higher $PH_2O/PH_2$ ratio, since the diffusion rates of the ions are so high that equilibrium is not established between the gas phase and the iron oxide and magnetite formation $Fe_3O_4$ is suppressed.

On account of the high $PH_2O/PH_2$ ratios and the high steam contents resulting therefrom in the reacted gas of the treatment compartment, there are no local depletions in oxidizing reactants, accordingly there are also no differences in the layer thicknesses. Even in the case of highly complicated components in which dead-end boreholes are present, 100% closed covering layers formed. Furthermore, on account of the high availability of water, small parts as bulk materials are oxidized free of contact.

Figure 5:
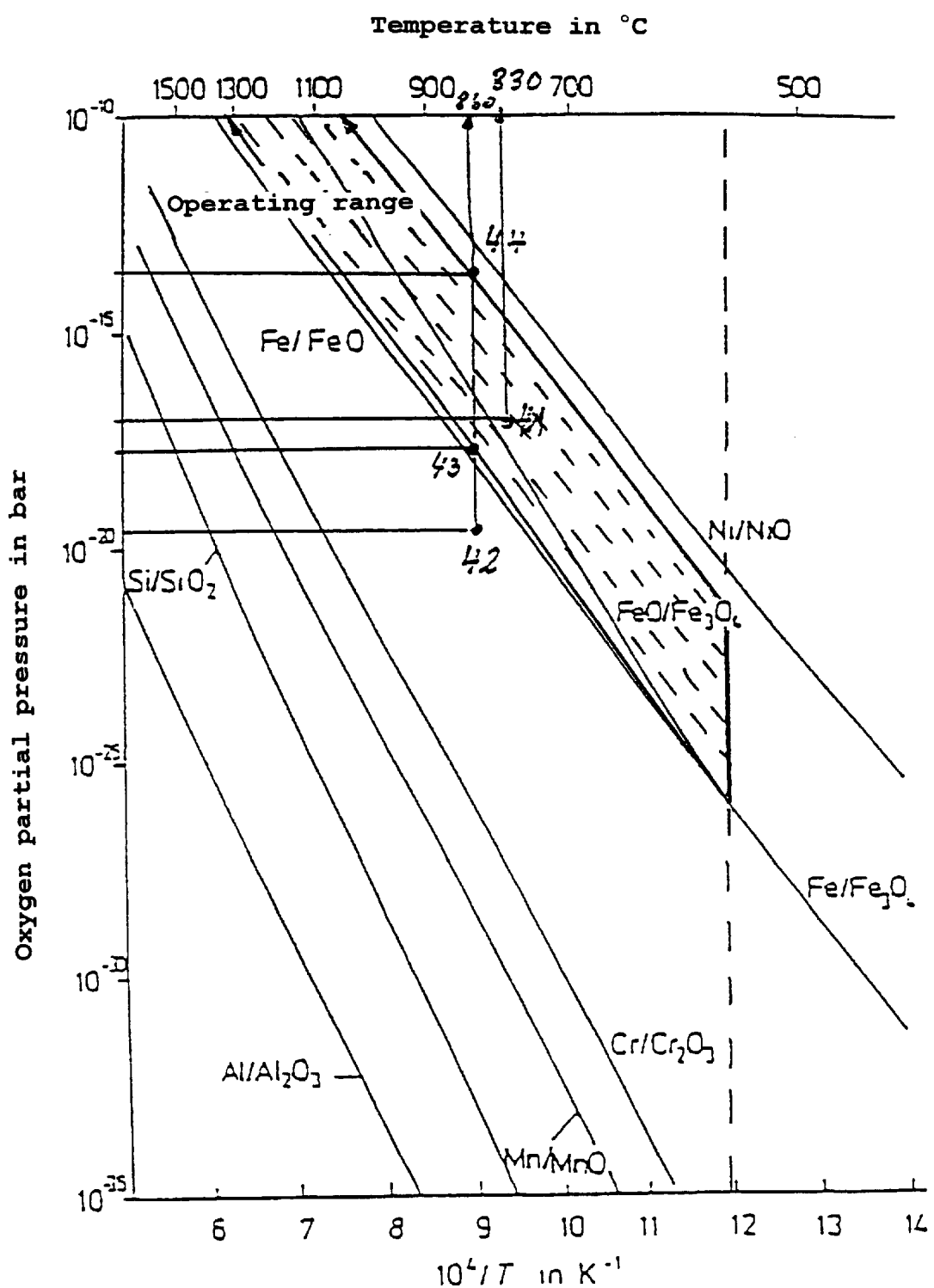
FIG. 5 is a graph showing the operating range in which oxidation takes place.

Since the FeO formation starts within a period of <3 minutes, preferably <1 minute, the change of gas phase takes place virtually instantaneously, so that decarburization during the first oxidation phase cannot take place (FIG. 5). A covering layer blocking the bright metal surface forms immediately, which prevents the reaction between the steam and the dissolved carbon. The oxide layer cannot dissolve carbon, therefore carbon diffusion through the oxide layer is prevented. Since iron is required for the oxide formation, the carbon dissolved in the surface region readily accumulates at the oxide-metal phase boundary, but this is made up for during the short oxidation time.

Demineralized water, which is injected into the treatment compartment of the furnace in liquid form, has proved to be particularly advantageous as oxidizing reactant, since water evaporates instantaneously at the temperatures and immediately establishes the sought-after $PH_2O/PH_2$ ratio. In addition, there is the fact that the oxidizing reactant water is universally available and is the economic optimum for the user. When the oxidizing reactant water is used, a uniformly opaque blackening of the parts is achieved. Other oxygen-containing compounds can also be passed or injected into the treatment compartment as reactant and thus establish a defined oxygen activity, which is necessary to oxidize iron to wuestite (FIG. 5).

FIG. 5 shows the operating range in which oxidation takes place. The oxygen partial pressure in bar, which is proportional to the oxygen activity, is plotted on the vertical axis, and the reciprocal of the temperature in Kelvin is plotted on the horizontal axis. In addition, the two oxidation operating points 41 and 44 of the two examples 2 and 1 are plotted. The reference number 41 represents the $PH_2O/PH_2$ ratio established of approximately 3 and the reference number 44 represents the $PH_2O/PH_2$ ratio of approximately 140.

When the preferred reactant water is used, nitrogen and/or endothermic atmosphere and/or hydrogen and/or hydrocarbons are passed or injected as additional substances into the treatment compartment, at least on of these substances, preferably nitrogen, being used as propellent for atomizing the water. The substances act to maintain the furnace pressure and/or to establish the necessary gas atmosphere in the treatment compartment of the furnace. They set the $PH_2O/PH_2$ ratio in the required limits.

The parts furnished with the FeO oxide layer, after an oxide layer <10 $\mu$m is achieved, are cooled in a quenching medium in such a manner that enlargement of the oxide layer is inhibited, preferably stopped, and the oxide layer present is retained. The cooling is performed at the end of the process for the joint oxidation and heat treatment and prevents further growth of the oxide layer to oxide layer thicknesses >10 $\mu$m. The oxide layer formation is immediately terminated by the cooling in the quenching medium.

The oxide layer also adheres after the annealing of the parts at temperatures up to 500° C. without the appearance of the surface being changed.

The oxidation process is reversible, that is to say the oxide layers formed can be reduced in a second hardening process and subsequently reformed, without the material properties being adversely affected.

A particularly advantageous arrangement for carrying out the process features means for feeding 18, 19; 21, 22; 20, 26; 23, 27 the reactant 18, 19 and hydrocarbons 21, 22 and nitrogen 20, 26 and endothermic atmosphere 23, 27 into the treatment compartment 10 of the furnace 25 and a controller 15 for open-loop and/or closed-loop control of the means. The feeding means 18, 19; 21, 22; 20, 26; 23, 27 comprise lines 18, 21, 23, 26 in which control elements 19, 22, 20, 27 are arranged, the control elements being automatically controllable by the controller 15 via control lines 14, 16, 17, 28, 29. The controller 15 sets the control elements between an open and closed position, depending on actual signals determined in the treatment compartment 10 and/or time signals recorded in the controller, so that the passing or atomization of the oxidizing reactant into the treatment compartment 10 is released or blocked. A fan arranged in the treatment compartment 10 of the furnace 25 is designated 24.

The automated process procedure ensures reproducible oxidation and heat treatment of the parts. By means of closed-loop control of the $PH_2O/PH_2$ ratio, the oxygen activity is kept constant and thus the growth rate and morphology at each time point is ensured. For the closed-loop control, the actual signals are formed as a function of the $PH_2O/PH_2$ ratio, which are compared with preset signals recorded in the controller. If the actual signals deviate from the preset signals, the position of the control elements is adjusted.

Particularly advantageously, the actual signals are determined by means of a $O_2$ probe 13 or a lambda probe, since the actual effective oxygen activity on the oxide surface is determined by these sensors.

ILLUSTRATIVE EXAMPLE 1

In a batch multipurpose chamber furnace 25, steels for case-hardening or hardening and tempering, which were present unsorted as bulk material 12 in the treatment baskets 11, were carbonized, carbonitrided or only hardened and tempered batchwise at temperatures between 800° C. and 950° C. An endothermic atmosphere (20% CO, 40% $H_2$, remainder $N_2$), which is prepared from natural gas or propane with air or from methanol and nitrogen flowed continuously through the multipurpose chamber furnace during the heat treatment as protective gas or carrier gas. The carbon level of the gas phase was controlled by adding hydrocarbons until the desired surface hydrocarbon content or the case-hardening thickness of the parts was achieved. Shortly before the end of the treatment time, an oxidizing reactant, for example demineralized water, was injected into the treatment compartment of the furnace at a temperature of approximately 860° C. in the course of 1 minute together with nitrogen. The volumetric flow rates of the oxidizing reactant and of the nitrogen were set so that a $PH_2O/PH_2$ ratio >0.3 and <150 formed in the treatment compartment of the furnace. Over a time period of <20 minutes, a thin well-adhering FeO oxide layer <10 $\mu$m having bluish-black color formed.

FIG. 5 (Illustrative Example 1) shows the entire heat-treatment process with respect to oxygen activity. The setting of the surface carbon content of 0.70% C (42) is in the iron stability area and thus the surface of the parts under these conditions is metallically bright. In the changeover to oxidizing conditions, the FeO stability line is exceeded (43) after 0.5 minutes, and after a further 12 minutes of oxidation time, the final oxygen activity of log PO2=−12.75 is reached (44).

The oxide layers formed on the parts under this procedure were likewise defect-free. The dew point of the oxidation gas phase was approximately +80° C. at the end of the treatment.

An optical test showed that the epitaxial oxide layer is absolutely uniform and bubble-free. Prepared polished-section images showed a decarburization-free surface zone which consisted of wuestite (FeO) and a bordering transition region.

ILLUSTRATIVE EXAMPLE 2

The oxidation of the parts is carried out at the end of a heat treatment, such as hardening and tempering, case-hardening, carbonitriding etc., at temperatures >570° C. The process time in the heat treatment of the parts is not altered by the additional oxidation process.
Example: Hardening and Tempering a 58 CrV4 at 830° C. in a Multipurpose Chamber Furnace
The batch is heated in a diluted endothermic atmosphere:

| m³ endothermic atmosphere/h + 5 m³ of nitrogen/h + 150 l of propane/h | (of propane) (C control) |
|---|---|

(11% CO, 19% $H_2$, 1 to 2% $CH_4$, remainder $N_2$) and heated through and austenized at 830° C. The total hot-holding time is approximately 20 minutes and the C level of the gas atmosphere is held constant at 0.58% C.

Approximately 10 minutes before the end of the hot-holding time, approximately 5l/h of demineralized water are injected "abruptly" into the hot treatment compartment with nitrogen via a lance. The 5 l of water/h produced 6.2 m³ of steam per hour, so that a total volume of approximately 16 m³ of gas/h flows through the treatment compartment of the furnace.

The composition of the fresh gas is:
40% $H_2O$ (dew point=+75° C.); 10% $H_2$; 6% CO; remainder $N_2$ and the ratio of $PH_2O/PH_2$ is approximately 3. As FIG. 1 shows, the gas mixture thus has a highly oxidizing action.

FIG. 1a shows a diagram in which the stability fields of the individual solids—iron, wuestite and magnetite—are plotted as a function of temperature and the $PH_2O/PH_2$ ratio. The overall heat-treatment process is plotted in this diagram and thus the prevailing conditions with respect to gas phase and material are shown. During heating-up and hot-holding of the iron material, the surfaces of the parts remain metallically bright. Not until the oxidizing gas is injected into the treatment compartment does the oxygen activity change in such a manner that the stability of wuestite becomes possible for the first time. The desired iron oxide forms on the surface. During this oxidation phase, at the same time, the $PCO_2/PCO$ ratio is set which corresponds to the phase boundary iron/FeO at the end of the oxidation. A higher $PCO_2/PCO$ ratio is not possible on account of the iron oxide formed, that is to say only the water used is responsible for the formation of FeO. The $PCO_2/PCO$ ratio at the Fe/FeO phase boundary has a value of 0.5 at 830° C. and the $PH_2O/PH_2$ ratio resulting from the gases used is approximately 3.

The following voltages are established in the lambda-probe or $O_2$-probe used:

−973 mV (λ-probe, 600° C.)

−889 mV ($O_2$-probe, 830° C.)

Figure 2:
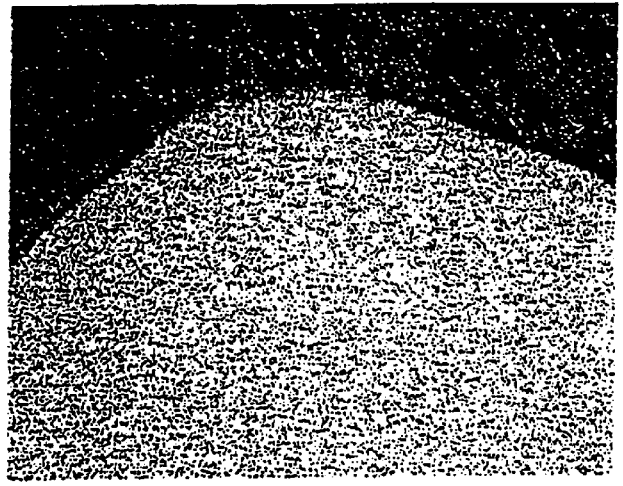
FIG. 2 shows light microscopy photographs of the structure of the starting material.
Figure 2:
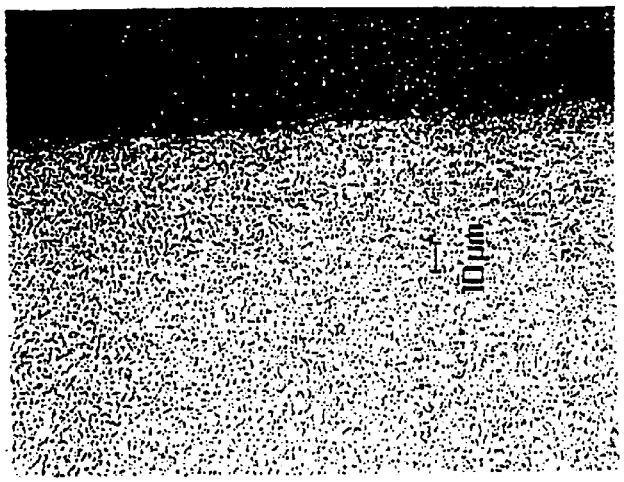
Figure 2:
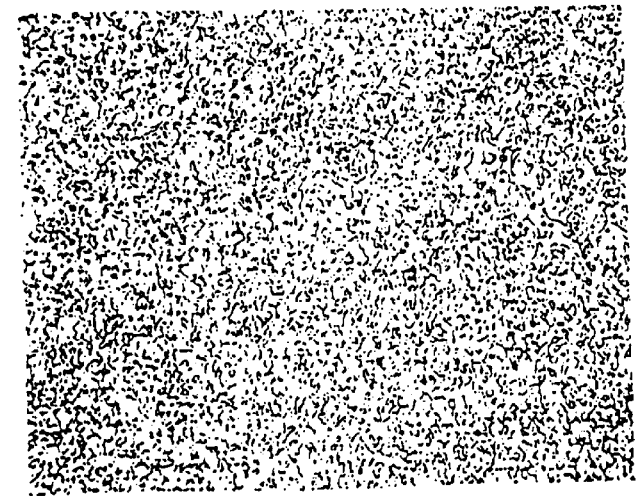

The high flow rate of approximately 16 m³/h causes, after a relatively short time (1 minute), a steady state of the protective gas to be achieved in the furnace (approximately 0.3 m³ capacity) and the parts to be oxidized. The surface of the parts is coated after a few minutes with a closed iron oxide layer which grows outward during the further course of oxidation. The increase in layer thickness is a function of the prevailing temperature, time and the $PH_2O/PH_2$ ratio and the added hydrocarbon concentration. Since the iron oxide cannot dissolve carbon, decarburization of the material surface zone is negligible (see FIGS. 2 and 3). FIG. 2 shows photographs of the structure of the starting material (3 mm hexagonal socket wrench/58 CrV4) examined by light microscopy. In the surface and core areas, the structures show no decarburization zones and are homogenous and fine-grained.

Figure 3:
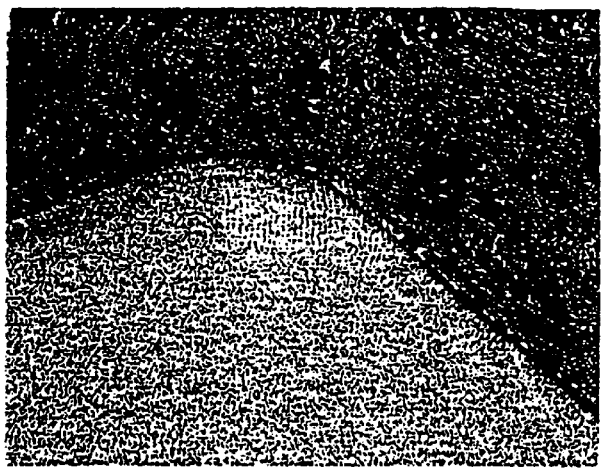
FIG. 3 is similar to FIG. 2 showing structures hardened and subjected to oxidation by the process of the invention.
Figure 3:
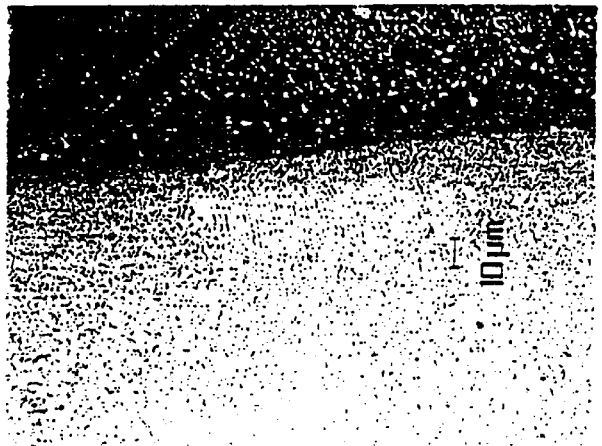
Figure 3:
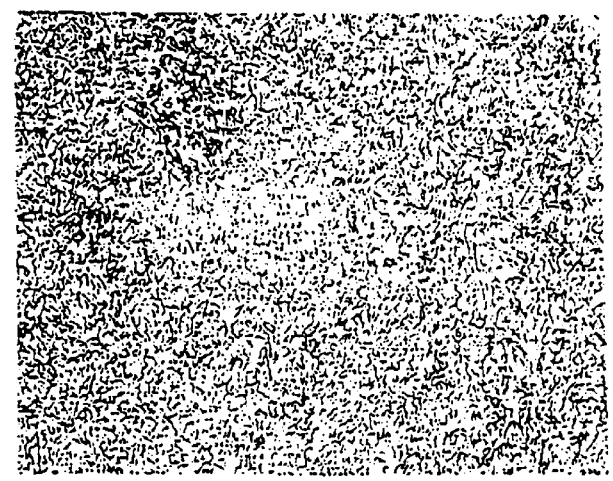
Figure 4:
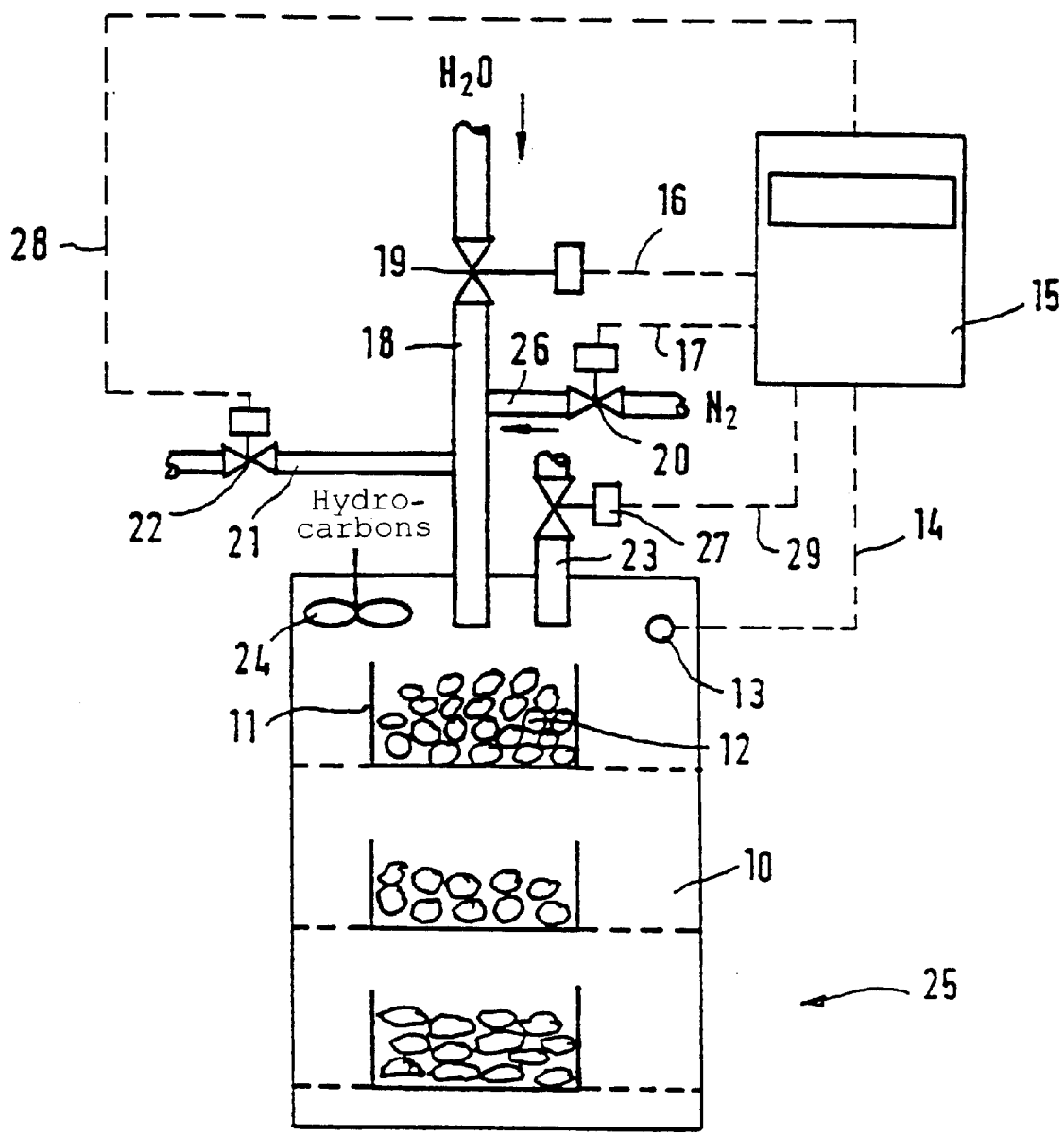
FIG. 4 schematically shows an arrangement for carrying out the process of the invention.

FIG. 3 comprises photographs of different enlargements of the structures of parts which were hardened and subjected to an oxidation by the process according to the invention. The pictures do not show any decarburization zones in the surface area of the parts. The transition between the metallic martensitic matrix and the outer oxide is sharp and shows good interlocking of the oxide layer with the metal, which indicates the good adhesion of the oxide. The thickness of the oxide layer is likewise easy to read off and is 3–4 µm of FeO.

Decarburization can only proceed via pores and cracks in the iron oxide layer. After the set oxidation time is complete, the feed of water is stopped and the batch is quenched in oil. The material used (Inbus hexagonal socket wrenches) was placed as bulk material in three charging baskets stacked on above the other and, after the heat treatment, showed no defect at all.

The following criteria were met:
1. highly adherent black oxide layer
2. no light points due to contact points
3. no bubble formation or flaking off of oxide
4. surface hardness before tempering: 57–58 HRC
5. torque in order
6. oxide layer adheres even after tempering (200 to 280° C.)
7. hardness after tempering: 52–54 HRC
8. no surface decarburization observable
9. overall evaluation: no defects The desired C level of the furnace gas atmosphere was reattained after a short time, so that decarburization of the subsequent batch did not occur. Water condensation was not observed on cold points of the prechamber and exhaust-gas pipe. The reproducibility of the oxidation results was faultless.

The corrosion resistance of these parts oxidized by the process according to the invention is better than the conventionally coated black-oxide coated and phosphatized parts, so that the storage life of the parts was increased without interfering rust forming. Oiling the oxidized parts or applying a fluid as performed in black-oxide coating can be omitted, without a rust film forming. Owing to the avoidance of the surface-active liquids, the parts also did not need to be laboriously cleaned in subsequent mechanical processing operations, owing to the lack of residual adherent fluid, the service life of drilling emulsion being prolonged, since contamination cannot occur. Before the black-oxide coating process, the hardened parts must be depassivated by sandblasting, so that the electrolytic deposition of antimony can proceed. Sand grains and particles deposit very readily in dead-end boreholes and cracks, which damage drills and cutting tools and thus greatly decrease the service life of the tools, so that complex careful cleaning work must be performed on the sand-blasted parts. It was possible to save these costs and losses of time by using the coating process according to the invention and carry out rapid further processing of the parts.

What is claimed is:

1. An apparatus for carrying out the process for the joint oxidation and heat treatment of parts at temperatures $\leqq 1300°$ C. in a treatment compartment of a furnace comprising a neutral or a reactive gas by passing on or atomizing at least one oxidizing reactant at temperatures $>570°$ C., wherein after conversion of the structure of the parts which is present at ambient temperature into the structure desired in the heat treatment, a $PH_2O/PH_2$ ratio is set in the treatment compartment so that the line $FeO+H_2=Fe+H_2O$ is exceeded and an oxide layer of $FeO<10$ $\mu$m is formed, the apparatus having feeding means for feeding the reactant into the treatment compartment and a controller for open- and/or closed-loop control of the means, wherein the feeding means consist of lines which open into the treatment compartment and in which control elements being controllable by the controller and the control elements changing the lines between the open and closed position as a function of the actual signals determined in the treatment compartment and/or of the time signals recorded in the controller, and wherein an $O_2$ probe which determines the actual signals is arranged in the treatment compartment.

2. The apparatus as claimed in claim 1, wherein the actual signals are formed as a function of the $PH_2O/PH_2$ ratio which change the position of the control elements as a function of preset signals recorded in the controller.

3. An apparatus for carrying out the process for the joint oxidation and heat treatment of parts at temperatures $\leqq 1300°$ C. in a treatment compartment of a furnace comprising a neutral or a reactive gas by passing on or atomizing at least one oxidizing, reactant at temperatures $>570°$ C., wherein after conversion of the structure of the parts which is present at ambient temperature into the structure desired in the heat treatment, a $PH_2O/PH_2$ ratio is set in the treatment compartment so that the line $FeO+H_2=Fe+H_2O$ is exceeded and an oxide layer of $FeO<10$ $\mu$m is formed; the apparatus having feeding means for feeding the reactant into the treatment compartment and a controller for open- and/or closed-loop control of the means, wherein the feeding means consist of lines which open into the treatment compartment and in which control elements being controllable by the controller and the control elements changing the lines between the open and closed position as a function of the actual signals determined in the treatment compartment and/or, of the time signals recorded in the controller, and wherein a lambda probe which determines the actual signals is arranged in the treatment compartment.

4. The apparatus as claimed in claim 3 wherein the actual signals are formed as a function of the $PH_2O/PH_2$ ratio which change the position of the control elements as a function of present signals recorded in the controller.

* * * * *